United States Patent [19]
Jack

[11] Patent Number: 5,097,128
[45] Date of Patent: * Mar. 17, 1992

[54] SUPERCONDUCTING MULTILAYER ARCHITECTURE FOR RADIATIVE TRANSIENT DISCRIMINATION

[75] Inventor: Michael D. Jack, Goleta, Calif.

[73] Assignee: Santa Barbara Research Center, Goleta, Calif.

[*] Notice: The portion of the term of this patent subsequent to Oct. 9, 2007 has been disclaimed.

[21] Appl. No.: 557,898

[22] Filed: Jul. 25, 1990

Related U.S. Application Data

[63] Continuation-in-part of Ser. No. 387,209, Jul. 31, 1989, Pat. No. 4,962,316.

[51] Int. Cl.$^5$ ............................................. H01L 39/00
[52] U.S. Cl. ................................ 250/336.2; 250/336.1; 505/849; 505/866
[58] Field of Search ..................... 250/336.2, 336.1; 505/848, 849, 866, 873; 333/99 S

[56] References Cited

U.S. PATENT DOCUMENTS 4,873,482 10/1989 Gray ................................ 250/336.2

Primary Examiner—Carolyn E. Fields
Attorney, Agent, or Firm—W. C. Schubert; W. K. Denson-Low

[57] ABSTRACT

A Frequency Domain Infrared Superconducting Transmission Line (FIRST) detector is comprised of a folded superconducting transmission line (36) interposed between a bottom electrode (32) and a top, radiation absorbing electrode (40). Dielectric layers (34, 38) separate the transmission line from the top and bottom electrodes. An optically induced change in the kinetic inductance of the transmission line shifts the transmission line phase velocity and resonant frequency. The shift in resonant frequency attenuates the propagating wave amplitude proportionally to the product of the transmission line Q and the frequency shift. A stacked pair of such detectors (50), sharing a common ground electrode (60), is disclosed to provide an inherent rejection of noise events due to ionizing radiation such as gamma radiation and package-generated Compton electrons.

26 Claims, 4 Drawing Sheets

SUPERCONDUCTING MULTILAYER ARCHITECTURE FOR RADIATIVE TRANSIENT DISCRIMINATION

This patent application is a continuation-in-part of copending and commonly assigned U.S. patent application Ser. No. 07/387,209, filed July 31, 1989, entitled "Frequency Domain Integrating Resonant Superconducting Transmission Line Detector" by Michael D. Jack, now U.S. Pat. No. 4,962,316 issued Oct. 9, 1990, the disclosure of which is incorporated herein in its entirety.

FIELD OF THE INVENTION

This invention relates generally to radiation detectors and, in particular, relates to (a) a Frequency domain Integrating Resonant Superconducting Transmission line (FIRST) detector having a superconducting meander line electrode interposed between two RF ground plane electrodes and also to (b) a stacked arrangement of two such detectors for discriminating against noise due to gamma radiation and/or Compton electron effects.

BACKGROUND OF THE INVENTION

In the above referenced commonly assigned U.S. Pat. No. 4,962,316, entitled "Frequency Domain Integrating Resonant Superconducting Transmission Line Detector" Michael D. Jack discloses a FIRST detector that is comprised of a folded superconducting transmission line coupled at an input port to a narrow band microwave source and coupled at an output port to a microwave power monitor. An optically induced change in an inductance of the transmission line shifts the transmission line phase velocity and resonant frequency. This shift in resonant frequency attenuates the propagating wave amplitude proportionally to the product of the Q and the frequency shift. The FIRST detector is disclosed as a three layer structure having a bottom ground plane electrode and a top, superconducting radiation absorbing electrode. Interposed between the top and bottom electrodes is a dielectric layer. The FIRST detector is fabricated as a folded transmission line and is operated within a frequency range from several hundreds of KHz ($10^3$ Hz) to one thousand GHz ($10^9$ Hz). The device provides a realization of an optical detection dynamic range of eight orders of magnitude.

It is thus one object of the invention to provide another embodiment of a FIRST detector constructed as a five layer device wherein the superconducting folded transmission line electrode is interposed between a top and a bottom RF ground plane electrode and is insulated therefrom by adjacent dielectric layers, and wherein radiation that is detected is absorbed within the top, superconducting, RF ground plane electrode.

Advanced IR sensors that are required to operate in an ionizing radiation environment are typically further required to generate high rate, multiple samples per dwell. Such sensors generally also require complex spatial/temporal signal processing algorithms to discriminate against sample data that is corrupted due to gamma radiation or Compton electron events. Unfortunately, these demanding requirements may adversely impact signal processing rates, power consumption and the I/O capability of the sensor by as much as an order of magnitude over those sensors designed for operation in a more benign environment.

It is thus another object of the invention to provide apparatus enabling low power and compact focal plane sensors, based on superconductive detectors, to operate in an ionizing radiation environment with minimal gamma discrimination processing.

It is a further object of the invention to eliminate current or proposed focal plane gamma discrimination algorithms and electronics by utilizing the gamma discrimination provided by a pair of stacked FIRST detectors.

SUMMARY OF THE INVENTION

The foregoing problems are overcome and the objects of the invention are realized by a novel five layer FIRST detector device and also by a superconductive radiation detector structure that includes two resonant transmission line detectors stacked one on top of the other. The two stacked detectors share a common RF ground plane interposed between the two superconducting transmission line electrodes. Radiation is fully absorbed in an upper superconducting RF ground electrode causing a shift only in the resonant frequency of the upper transmission line detector. However, ionizing radiation originating in the environment or Compton secondary electrons emanating from the detector substrate or package cause frequency shifts in both the upper and the lower resonant detectors. Circuitry that detects a shift in the lower resonant transmission line frequency identifies noise corrupted samples without recourse to extensive gamma discrimination circuitry employed with prior art detectors.

In greater detail the invention concerns a radiation detector that includes a superconductive transmission line electrode having an input port for coupling to a frequency signal and an output port for coupling to a sensor for detecting a variation in the frequency signal. The transmission line electrode is interposed between a first electrode and a second electrode each of which is coupled to a common RF ground potential. The transmission line electrode is responsive to incident radiation that is absorbed within one of the superconducting RF ground electrodes for having induced therein a change in a resonant frequency of the transmission line electrode.

The invention further concerns a frequency domain radiation detector having at least two transmission line electrodes each having a resonant frequency and an input port for coupling to a frequency source. A first one of the transmission line electrodes is responsive to incident radiation that is absorbed in an overlying RF ground plane electrode for having induced therein a detectable change in the resonant frequency. Each of the transmission line electrodes has an output port for coupling to an event detector for detecting a substantially simultaneous occurrence of a change in output frequency of each of the transmission line electrodes, thereby indicating an occurrence of a ionizing radiation-induced noise event.

BRIEF DESCRIPTION OF THE DRAWING

The above set forth and other features of the invention are more fully described in the ensuing Detailed Description of the Invention when read in conjunction with the attached Drawing, wherein.

DETAILED DESCRIPTION OF THE INVENTION

Figure 1:
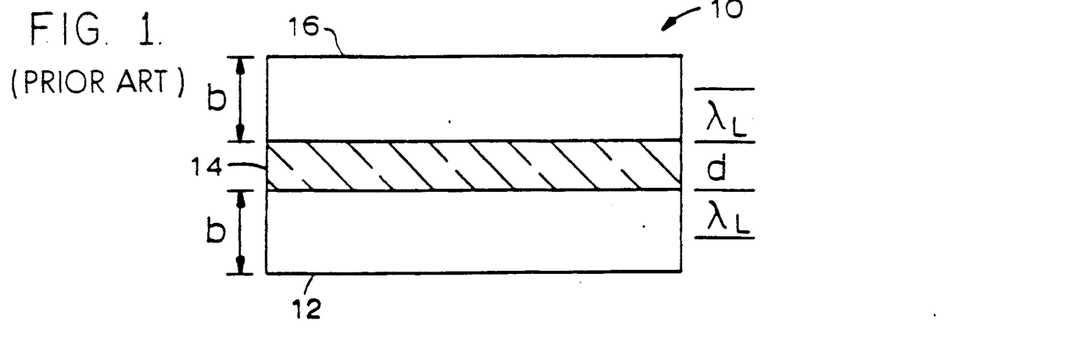
FIG. 1 is a cross-sectional view, not to scale, of a superconducting transmission line having a ground plane, a dielectric layer and a superconducting top electrode in accordance with the disclosure of commonly assigned U.S. Pat. No. 4,962,316.

Reference is made first to FIG. 1 where there is illustrated a cross-sectional view of a superconducting transmission line 10 of the type disclosed in commonly assigned U.S. Pat. No. 4,962,316, filed July 31, 1989, entitled "Frequency Domain Integrating Resonant Superconducting Transmission Line Detector" by Michael D. Jack of which this application is a continuation-in-part.

The transmission line 10 is comprised of a RF ground electrode, or plane, 12 having a magnetic penetration depth $\lambda_L$ and a thickness b, a dielectric layer 14 of thickness d, and a top superconducting electrode 16 having a magnetic penetration depth $\lambda_L$ and a thickness b. Electromagnetic waves propagate along the transmission line with a velocity given by:

$$V_{ph} = (\mu_0 \epsilon)^{-\frac{1}{2}} \left[ 1 + 2 \frac{\lambda_L}{2} \coth \frac{b}{\lambda_L} \right]^{-\frac{1}{2}} . \quad (1)$$

For reasonable values of $b \approx \lambda_L$, $d \approx 0.2\lambda_L$, $\lambda_L = 1400$ Angstroms, and the dielectric constant $\epsilon$ approximately nine times that of free space; the group velocity $V_g$ and phase velocity $V_{ph}$ can be shown to be approximately $3 \times 10^9$ cm/sec.

The superconducting electrode 16 is preferably fabricated as a well-coupled high current density polycrystalline or nominally single crystalline film layer. Materials suitable for the fabrication of the electrode 16 include conventional "low temperature" superconductors such as Pb, Nb, NbN, the superconducting compounds having the A-15 crystal structure, $Nb_3(M)$ where M is Sn, Al or Ge, as well as high temperature superconductors including compounds based on compositions containing (Y, Ba, Cu, O), (Bi, Sr, Ca, Cu, O), (Tl, Ba, Ca, Cu, O) and elemental replacements or substitutions thereof. An appropriate thickness of the upper superconducting electrode 16 is tailored to optimize performance in the desired wavelength range from $10^{-3}$ to $10^{-6}$ centimeters. Appropriate dielectrics include amorphous polycrystalline or crystalline insulators such as silicon dioxide, silicon nitride, aluminum, magnesium, zirconium, rare-earth or niobium oxides or epitaxially grown layers comprised of compounds related to the underlying superconductors. The dielectrics may also be thinned single crystal substrates such as oxides of Mg, Al, Strontium Titanate, Lanthanum Gallate, or Lanthanum Aluminate on which high quality superconductors may be grown. Thicknesses of dielectrics are chosen with respect to desired resonant frequency, dielectric losses and transmission line geometry and may vary in the approximate range between $10^{-2}$ to $10^{-6}$ centimeters. Dielectric thicknesses are comparable to or smaller than the spacing between adjacent folds of the upper electrode 16 to reduce crosstalk. Typical widths of the electrode 16 are approximately 0.1 micron to approximately 1000 microns. Typical overall lengths may range from approximately 0.001 cm to approximately 100 cm. The resonant frequency of the electrode 16 may vary between approximately several hundred KHz to approximately 1000 GHz and is, as indicated in Equation (2) below, inversely proportional to the length of the electrode 16.

Such a superconducting transmission line, having the preferred topological configuration including two or more ports, is advantageously applied to the detection of infrared or visible radiation. It is noted that the use of the invention is not limited to only these wavelengths but can be employed to detect radiation having wavelengths from the centimeter range up to and including x-rays and gamma rays. That is, the detector of the invention permits operation within a spectral band of from one or more centimeters to one or more Angstroms. The specific wavelength detected is a function of the bandgap of the material. For example, materials having a bandgap of a few tenths of a millivolt such as thallium, arsenic and zinc are adaptable to the detection of centimeter length electromagnetic waves. Also, the material bandgap can be "tuned" to a specific wavelength through the use of an induced energy bandgap resulting from the exploitation of the superconducting proximity effect. The use of the proximity effect is disclosed in commonly assigned copending U.S. patent application Ser. No. 07/377,698, filed July 10, 1989, entitled "Proximity Effect VLWIR Radiation Detector" by J. A. Wilson.

Figure 2A:
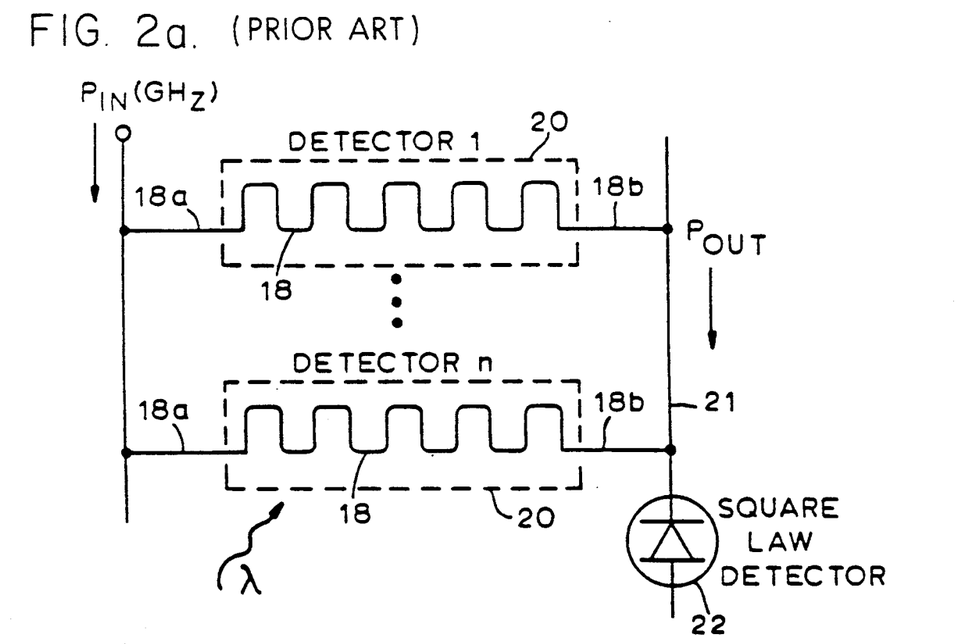
FIG. 2a is a representative top view, not to scale, showing radiation detectors each of which is comprised of a folded superconducting transmission line having an output coupled to a wideband non-resonant transmission line.

An example of one preferred topological configuration is shown in FIG. 2 where a transmission line electrode 18 can be seen to be folded between an input port 18a and an output port 18b. The folded transmission line electrode 18, also referred to as a "meander line", forms a portion of a radiation detector 20 that resonates at multiples of frequencies inversely proportional to the time for a wave to propagate from one end of the transmission line to the other and back:

$$f_N = N V_{ph}/2L. \quad (2)$$

An on-resonance probe pulse is simultaneously applied to the input ports 18a of the plurality of detectors 20 while the output ports 18b are sequentially coupled to an output transmission line 21 that is coupled to a detector, such as the square law diode detector 22. Power gain is provided by reading out the shift in resonant frequency through attenuation of the probe pulse power ($P_{IN}$). A large change in $P_{OUT}$ is achieved due to the high Q of the resonant transmission line 18.

In the embodiment disclosed in commonly assigned U.S. Pat. No. 4,962,312 radiation is absorbed within the electrode 16 of the FIRST detector 10, the electrode 16 being comprised of a superconducting film which may be less than 1000 Angstroms in thickness an which absorbs substantially all optical quanta within a spectral band of approximately 0.3 micron to approximately 30 microns or more. Cooper pair breaking by incident photons results in a change in the kinetic inductance and a consequent shift in the resonance frequency of the superconducting transmission line 18. For a high Q structure such as the transmission line 18 a small shift in resonance results in a large change in the amplitude of the propagated on-resonance probe pulse. Furthermore, a large probe pulse amplitude may be propagated along the superconducting transmission line 18 with minimal loss or power dissipation, thereby reducing the sensitivity requirements for the probe pulse detector(s) 22.

Upon optical irradiation of the FIRST detector superconducting paired electrons, or Cooper pairs, are broken thereby creating excess normal state quasiparticles. This reduction in electron pairs participating in the superconducting ground state reduces the critical current density that can screen magnetic fields thereby increasing the screening or magnetic penetration depth, $\lambda_L$. The penetration depth is proportional to the inverse square root of the number of electron pairs and can be expressed as:

$$\lambda_L = \lambda_{Lo}(1 - (n_{qp}/2n_s)), \qquad (3)$$

where $n_{qp}$ is the quasiparticle density, $n_s$ is the electron pair density and $\lambda_{Lo}$ is the magnetic penetration depth in the absence of light.

The number of broken electron pairs induced in the upper electrode 16 is proportional to the photon flux, yield per photon (r) and quasiparticle lifetime ($\tau$) and is inversely proportional to the thickness (b) as given by the expression $$n_{qp} = (r(Flux)\tau)/b. \qquad (4)$$

Assuming a flux of $10^{11}/cm^2$, a per photon yield of six quasiparticles for each 10 micron photon, a lifetime of one millisecond and b=400 Angstroms a quasiparticle density of $1.5 \times 10^{14}/cm^3$ is obtained.

Figure 5A:
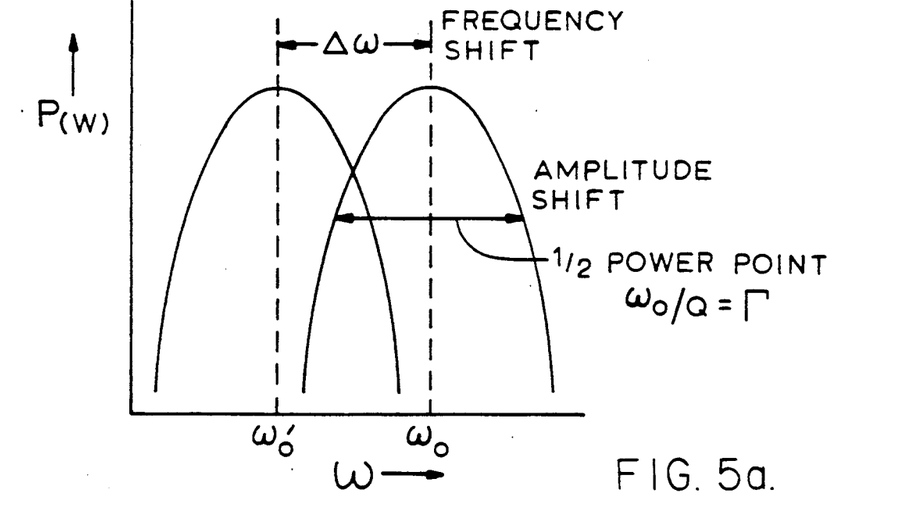
FIG. 5a is a graph that illustrates resonant transmission line characteristics, specifically a frequency and an amplitude shift as a function of illumination.

The steady state density of superconducting pairs is given approximately by $$n_s = N(o)E_g, \qquad (5)$$

where $N(o)$ is the single spin density of states and $E_g$ is the superconducting energy gap. For a density of states of $10^{20}$ and an energy gap of 16 meV there is obtained a change in penetration depth and, hence, resonant frequency of approximately 1 part in $10^4$ ($\Delta f/f = n_{qp}/n_s$). This change in resonant frequency due to illumination corresponds to a resonant frequency shift of approximately 0.4 MHz. As shown in FIG. 5a this change in resonant frequency also results in a corresponding attenuation of the narrow band microwave source which propagates through the resonant transmission line 18 by more than a factor of five. In FIG. 5a the term $P(\omega)$ is given by the expression $$P(\omega) \alpha 1/((\omega - \omega_o)^2 + (\omega_o/2Q)^2). \qquad (6)$$

Figure 5B:
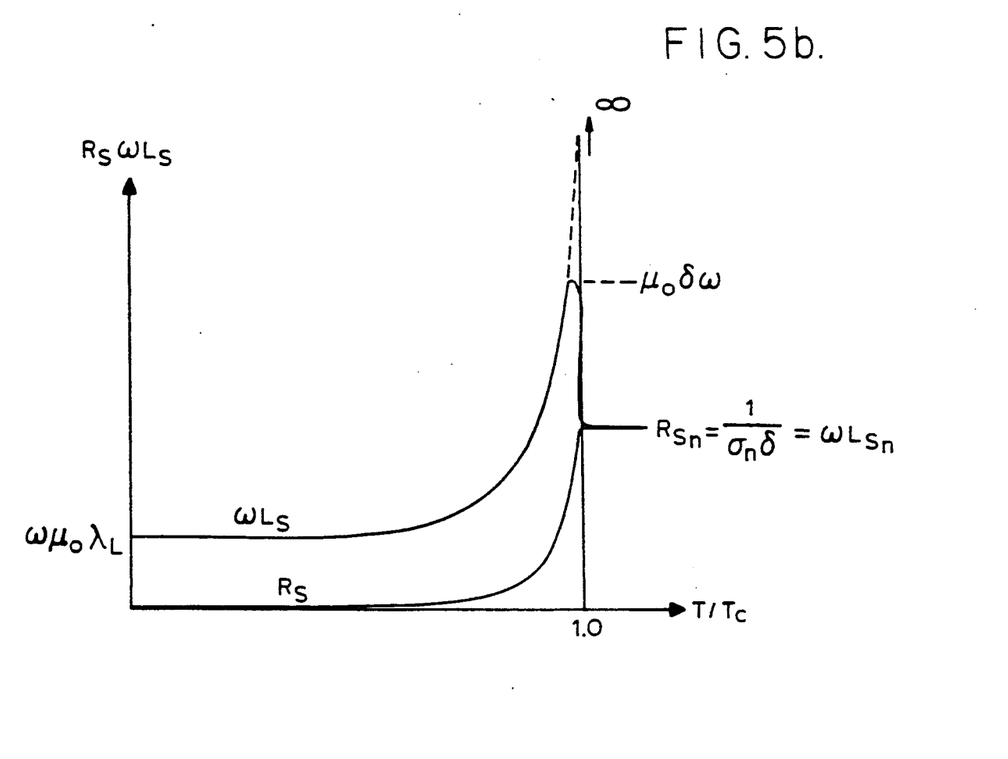
FIG. 5b is a graph which illustrates the temperature dependence of the resistive ($R_s$) and inductive ($\omega L_s$) components of the surface impedance of a superconductor.

The temperature dependence of the resistive ($R_s$) and inductive ($\omega L_s$) components of the surface impedance of a superconductor are shown in FIG. 5b. As can be seen convergence of the reactive component, or inductance, rapidly approaches an equilibrium value at approximately 70% of the critical temperature. Thus, operation of the FIRST detector is achieved at up to approximately 70% to approximately 80% of critical temperature. For 100K HTS material this beneficially corresponds to operation at liquid nitrogen temperature.

Figure 2B:
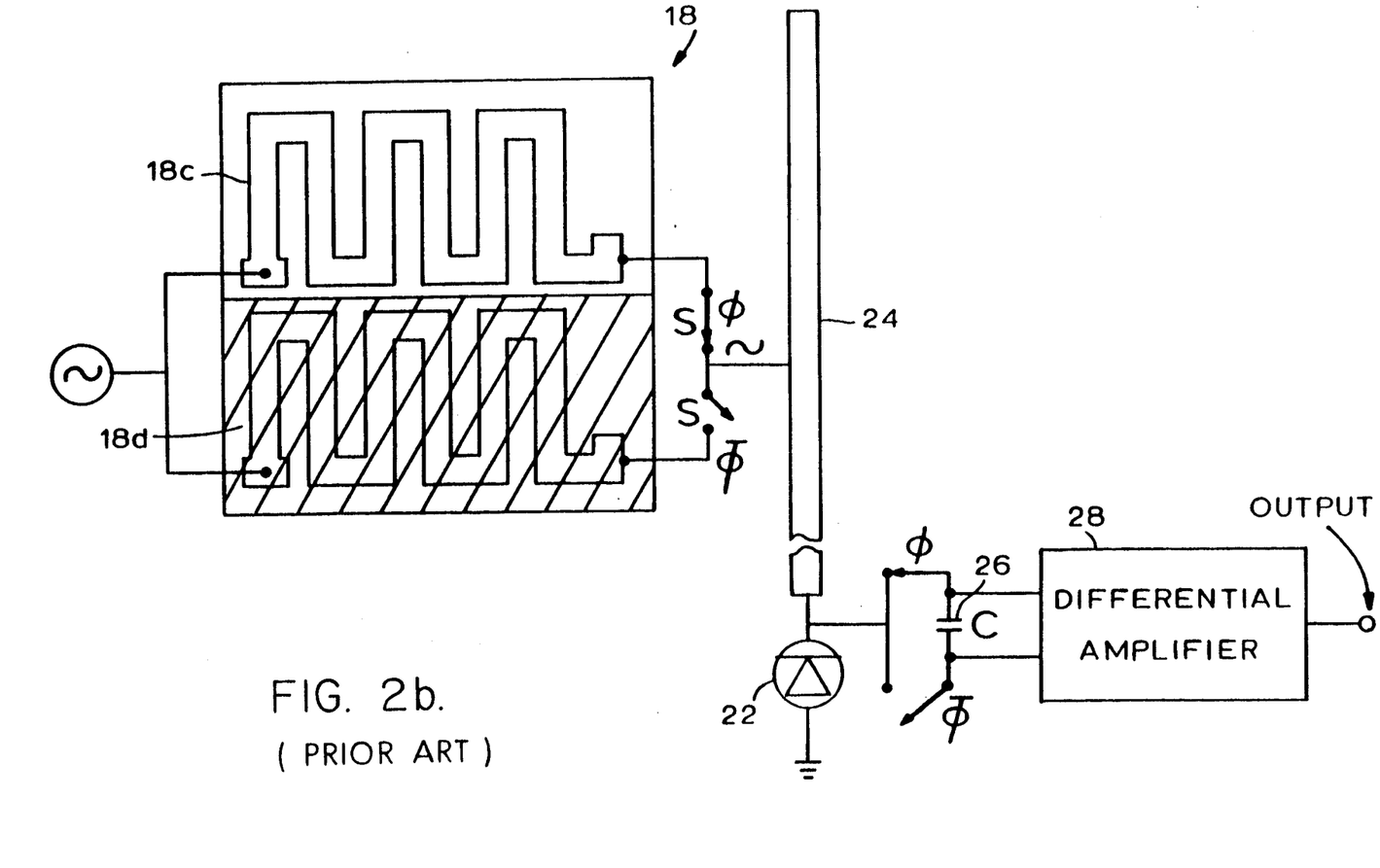
FIG. 2b is a representative top view, not to scale, and a circuit diagram showing radiation detectors arranged as differential pairs of illuminated and nonilluminated folded superconducting transmission lines.

Referring to FIG. 2b there is shown an embodiment of the FIRST detector wherein the detector 18 comprises differential pairs of matched transmission line electrodes 18c and 18d, one line of the pair (18c) being illuminated while the other line (18d) is maintained in a nonilluminated or dark condition. Detectors 18c and 18d are alternatively coupled to a wide bandwidth non-resonant stripline 24 by an associated switch S. Stripline 24 is coupled to a detector 22 and, via a switched capacitor 26, to a differential amplifier 28. Enhanced dynamic range and offset correction are achieved by multiplexing the output from the optically exposed element (18c) and the shielded element (18d) and integrating the difference in transmitted microwave power onto a differential element, such as the switched capacitor 26. The difference signal is amplified utilizing a wideband amplifier 28. Switches S and those coupling to C 26 are shown being alternately energized by timing signals $\phi$ and $\bar{\phi}$. Alternatively the difference between transmitted power from a single element sequentially illuminated and exposed to radiation may be amplified utilizing the same circuitry, with the same effect.

In the embodiments of FIGS. 1, 2a and 2b each of the meander line electrodes 18a-18d is fabricated as a narrow width linear element that overlies the low loss dielectric layer 14 and the bottom RF ground plane 12. As an example, a one micron width line, when folded such that it densely fills a 100 micron × 100 micron pixel area, provides an effective length of approximately 0.5 cm. Such a transmission line 18, assuming a typical dielectric constant value, resonates at multiples of approximately 4.0 GHz, a frequency that is compatible with commercially available, high performance microwave Schottky diode detectors. The narrow band transmission line 18 is coupled to the sensor 22 and to the narrow band microwave source by, for example, resistive or capacitive inputs that are integrated with the line 18. A sharp resonance characteristic having a Q value in excess $10^5$ is achieved. A detector to detector uniformity of one part in $10^5$ is limited primarily by lithographic variations in the length of the folded transmission line electrode 18. In other embodiments the region within which the line is folded may have dimensions of approximately 10 microns by 10 microns to approximately 1000 microns by 1000 microns or greater. Of course the region need not be square in shape.

The transmission line electrodes 18 are coupled to readout circuitry such as that described in the before mentioned commonly assigned U.S. Pat. No. 4,962,316, the disclosure of which has been incorporated herein in its entirety.

Having thus reviewed in detail the structure and operation of the FIRST detector embodiment of commonly assigned U.S. Pat. No. 4,962,316 there is now described a five layer FIRST detector embodiment wherein radiation is absorbed within a top superconducting RF ground plane electrode instead of within the superconducting meander line. It is to be understood that the five layered embodiment now described may be used in place of the three layered embodiment previously described, either singularly or in arrays of same. Furthermore, the previous disclosure as to output circuitry, current scanners and the like applies equally to the five layered embodiment now described.

Figure 3:
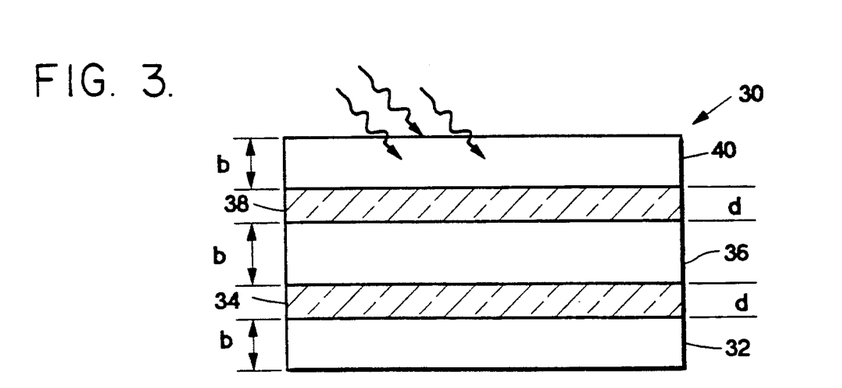
FIG. 3 is a cross-sectional view, not to scale, of a further embodiment of the FIRST detector having a superconducting transmission line electrode interposed between a top and a bottom RF ground plane electrode and insulated therefrom by dielectric material.

Referring now to FIG. 3 there is shown, in accordance with one aspect of the present invention, an embodiment wherein a radiation detector 30 is comprised of a bottom RF ground plane electrode 32, an overlying dielectric layer 34, a superconducting transmission line electrode 36, an overlying dielectric layer 38 and a top, radiation absorbing RF ground plane electrode 40. For this embodiment at least the radiation absorbing electrode 40, but preferably both of the RF ground electrodes 32 and 40, are comprised of a low temperature or a high temperature superconducting material. Radiation incident on the top surface of the detector 30 is absorbed, typically, within the first 200 Angstroms to 1,000 Angstroms of the top surface. The absorbed radiation breaks Cooper pairs causing an increase in the quasiparticle density. This increase in the quasiparticle density causes an increase in the magnetic penetration depth which results in a corresponding decrease in the resonant frequency of the transmission line electrode 36. The material compositions of the various layers of the detector 30 are the same as that disclosed above for the corresponding layers of the three layer FIRST detector 10 of FIG. 1. In this regard the additional dielectric 38 has the same composition as the dielectric layer 34, and may be continuous therewith, and the upper RF ground electrode 40 may have the same composition as the lower RF ground electrode 32, although this is not required for correct operation. Also, although the thickness of layer 34 may equal the thickness of layer 38 and the thicknesses of layers 32, 36 and 40 may all be equal to one another such is not a requirement. For example, it may be desirable to provide the layer 40 with a thickness that is selected based upon radiation absorption requirements resulting in the thickness of layer 40 differing from that of layer 32 and/or layer 36.

By example, one embodiment of the FIRST detector 30 includes a superconducting stripline electrode 36 extending over an area of 0.8 cm by 0.8 cm, the stripline electrode 36 being interposed between the two RF ground electrodes 32 and 40. The lower ground plane electrode 32 is comprised of Nb as is the material of the stripline electrode 36. The upper ground plane electrode 40 is comprised of an infrared radiation sensitive $Y_1Ba_2Cu_3O_{7-x}$ high temperature superconductor. The detector is operated immersed in superfluid helium at 2.3K or is surrounded by a helium gas at 4.2K. At these temperatures a high "loaded" Q of approximately 10,000 has been achieved at a resonant frequency of approximately 700 MHz. The use of all high temperature superconducting material permits operation at correspondingly higher temperatures.

Figure 4:
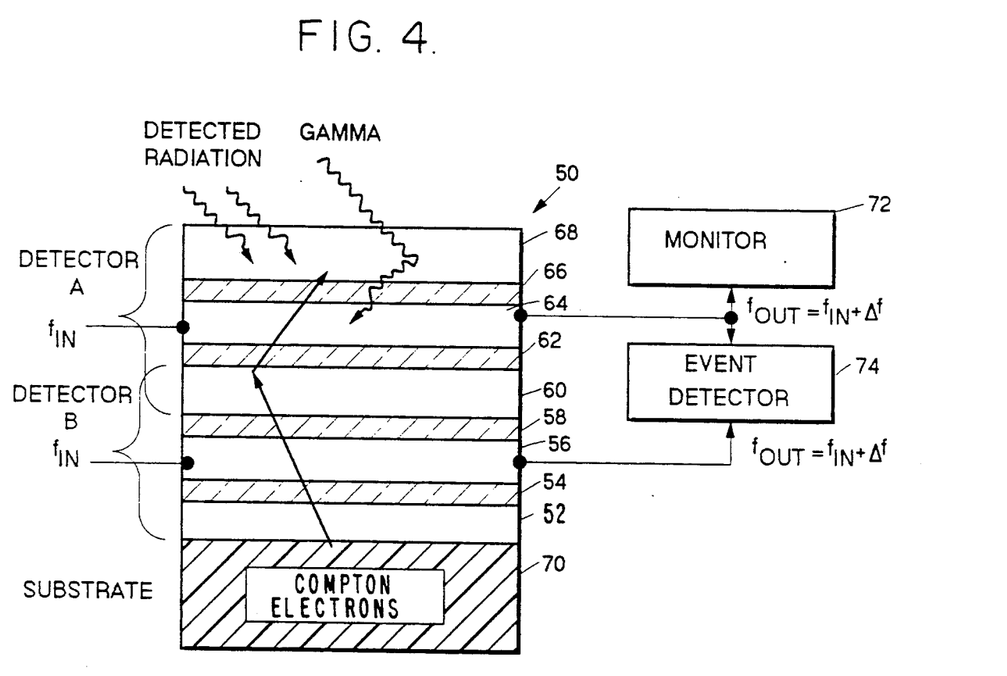
FIG. 4 is a cross-sectional view, not to scale, illustrating a sensor arrangement having a pair of FIRST detectors stacked one on top of the other and sharing a common RF ground plane electrode that is interposed between the two transmission line electrodes.

In accordance now with a further embodiment of the invention the FIRST detector architecture depicted in FIG. 3 is employed to provide intrinsic discrimination against noise resulting from ionizing radiation such as gamma radiation and noise resulting from scattered Compton electrons. As shown in FIG. 4 two FIRST detectors are stacked vertically. The lower detector (Detector B) is comprised of layers 52, 54, 56, 58, and 60. An upper detector (Detector A) is comprised of layers 60, 62, 64, 66, and 68. As such, Detector A and Detector B share a common RF ground plane electrode 60. Detector A and Detector B are disposed on a supporting substrate 70 which is preferably comprised of a substantially inactive, low Compton electron-generating material such as silicon (Si), sapphire ($Al_2O_3$), or Lanthanum Aluminate. Radiation incident on the top FIRST detector (Detector A) is absorbed within the first 200 Angstroms to 1000 Angstroms of the top surface of the upper layer 68. The absorbed radiation breaks Cooper pairs causing an increase in the quasiparticle density, an increase in the magnetic penetration depth and a corresponding decrease in the resonant frequency of the meander transmission line electrode 64. As a result, a detectable change occurs in an RF probe pulse ($f_{IN}$) that propagates through the transmission line 64 and which is detected by a monitor 72.

In that the incident radiation does not penetrate to the meander line electrode 64 the bottom FIRST detector (Detector B) is optically "blind". However, gamma radiation entering the top of the detector 50 and secondary Compton electrons scattered from the package and substrate 70 penetrate both Detector A and Detector B causing a substantially equal density of scattering events, that is a substantially equal density of generated quasiparticle pairs, resulting in simultaneous equal magnitude frequency shifts in both Detectors A and B. A coincidence or event detector 74 is coupled to both frequency outputs for detecting a simultaneous occurrence of a frequency shift (delta f) in each output. This effect occurs even for relatively low energy ($\leq 20$ keV) gamma radiation. The gamma radiation loses only a small amount of energy penetrating these thin layers, which may be only $\leq 5 \times 10^3$ Angstroms for the two detector stack illustrated. Lower energy gamma radiation is generally not observable in either Detector A or Detector B, resulting in substantially all gamma radiation and Compton electron events being readily distinguished from optical signals.

It is noted that as used herein a transmission line is considered to include at least two electrodes separated by a dielectric material wherein one of the electrodes conveys a radio frequency (RF) signal and has a resonant frequency associated therewith. The value of the resonant frequency is a function at least of the length of the electrode and the thickness and composition of the dielectric material. Such an arrangement can be considered to form a resonant cavity structure. The electrode or electrodes that do not convey the RF signal and which define the walls of the resonant cavity are preferably maintained at RF ground potential. Typically these other electrodes will also be maintained at an earth ground potential but such is not a requirement. That is, these other electrodes may be maintained at some DC potential relative to earth ground. In the embodiment of FIG. 1 the radiation absorbing electrode 16 also conveys the RF signal and is comprised of superconductive material. For the embodiment of FIG. 3 at least the top radiation absorbing electrode 40 and the RF signal conveying electrode 36 are comprised of superconductive material. For the stacked embodiment of FIG. 4 at least the electrodes 56, 60, 64 and 68 are comprised of superconductive material in order to achieve the desired goal of detecting the occurrence of noise events common to each of the RF conveying electrodes 56 and 64.

As such, and while the invention has been particularly shown and described with respect to presently preferred embodiments thereof, it will be understood by those skilled in the art that changes in form and details may be made therein without departing from the scope and spirit of the invention.

What is claimed is:

1. A radiation detector comprising a first superconducting transmission line means having an input port for coupling to a frequency signal and an output port for coupling to sensor means for detecting a variation in the frequency signal, said transmission line means being interposed between a first electrode means and a second electrode means and forming a resonant cavity structure therewith, said transmission line means being responsive to radiation that is absorbed within one of the first or second electrode means for having induced therein a change in a resonant frequency of said transmission line electrode means.

2. A detector as set forth in claim 1 wherein said superconducting transmission line means includes third electrode means comprised of a layer of superconducting material, said third electrode means being separated from said first electrode means and from said second electrode means by a dielectric material.

3. A detector as set forth in claim 2 wherein said third electrode means has a substantially linear shape that is folded within a region.

4. A detector as set forth in claim 3 wherein said third electrode means has a width within a range of approximately 0.1 micron to approximately 1000 microns.

5. A detector as set forth in claim 3 wherein the region has linear dimensions within a range of less than approximately 10 microns by 10 microns to greater than approximately 1000 microns by 1000 microns.

6. A detector as set forth in claim 3 wherein said third electrode means has a length within a range of approximately 0.001 cm to approximately 100 cm.

7. A detector as set forth in claim 1 wherein the resonant frequency of said transmission line means is within a range of several hundred KHz to approximately 1000 GHz.

8. A detector as set forth in claim 1 wherein said detector is responsive to radiation within a spectral band of from one or more centimeters to one or more Angstroms.

9. A detector as set forth in claim 2 wherein said third electrode means is comprised of a high current density polycrystalline or a nominally single crystalline film layer.

10. A detector as set forth in claim 2 wherein at least the third electrode means and the radiation absorbing electrode means are comprised of a material selected from the group consisting essentially of Pb, Nb, NbN, superconducting compounds having an A-15 crystal structure, Nb$_3$(M) where M is Sn, Al or Ge, or compounds based on compositions containing (Y, Ba, Cu, O), (Bi, Sr, Ca, Cu, O), (Tl, Ba, Ca, Cu, O) and elemental replacements or substitutions thereof.

11. A detector as set forth in claim 2 wherein the dielectric material is comprised of an amorphous polycrystalline insulator, a crystalline insulator, or a thinned single crystal superconductor substrate material.

12. A detector as set forth in claim 2 wherein the dielectric material is selected from the group consisting essentially of silicon dioxide, silicon nitride, aluminum, magnesium, zirconium, rare-earth or niobium oxides, epitaxially grown layers comprised of compounds related to adjacent superconducting material, oxides of Mg, Al, strontium titanate, lanthanum gallate, lanthanum aluminate or combinations thereof.

13. A detector as set forth in claim 1 and further comprising a substrate and a second superconducting transmission line means disposed between the first superconducting transmission line means and the substrate.

14. A detector as set forth in claim 13 wherein the substrate is comprised of a material selected for generating a minimal number of Compton electrons.

15. A detector as set forth in claim 13 wherein the substrate is comprised of a material selected from a group consisting essentially of silicon, sapphire, lanthanum aluminate or combinations thereof.

16. A frequency domain radiation detector comprising at least two transmission line means each having a resonant frequency and an input port for coupling to a frequency source, a first one of the transmission line means being responsive to incident radiation that is absorbed in a closely adjacent electrode means for having induced therein a detectable change in the resonant frequency, each of said transmission line means having an output port for coupling to an event detector means for detecting a substantially simultaneous occurrence of a change in output frequency of each of the transmission line means for indicating an occurrence of a noise event.

17. A frequency domain radiation detector as set forth in claim 16 wherein each of said transmission line means is comprised of superconducting material and has a substantially linear shape having a width within a range of approximately 0.1 micron to approximately 1000 microns, said superconducting transmission line means being repetitively folded within a region and having a total length within a range of approximately 0.001 cm to approximately 100 cm and a resonant frequency within a range of several hundred KHz to approximate 1000 GHz.

18. A frequency domain radiation detector as set forth in claim 16 wherein the second one of the transmission line means is disposed such that it is not significantly influenced by the incident radiation that is absorbed by the electrode means closely adjacent to the first one of the transmission line means.

19. A frequency domain radiation detector for detecting radiation within a spectral band, the radiation detector comprising a substrate, a first RF ground electrode overlying the substrate, a first dielectric layer overlying the first RF ground electrode, a first transmission line electrode overlying the first dielectric layer, the first transmission line electrode being comprised of a patterned superconductive film, a second dielectric layer overlying the first transmission line electrode, a second RF ground electrode overlying the second dielectric layer, a third dielectric layer overlying the second RF ground electrode, a second transmission line electrode overlying the third dielectric layer, the second transmission line electrode being comprised of a patterned superconductive film, a fourth dielectric layer overlying the second transmission line electrode, and a third RF ground electrode overlying the fourth dielectric layer, the third RF ground electrode having a thickness such that substantially all radiation within the spectral band incident thereon is absorbed therein and induces a change in a kinetic inductance of the second transmission line electrode for changing the phase velocity and resonant frequency of the second transmission line electrode.

20. A detector as set forth in claim 19 wherein at least the first and the second transmission line electrodes and the third RF ground electrode are each comprised of a superconducting material.

21. A detector as set forth in claim 19 wherein the spectral band extends from one or more centimeters to one or more Angstroms.

22. A detector as set forth in claim 19 wherein the first and the second transmission line electrodes are each comprised of a material selected from the group consisting essentially of Pb, Nb, NbN, superconducting compounds having an A-15 crystal structure, $Nb_3(M)$ where M is Sn, Al or Ge, or compounds based on compositions containing (Y, Ba, Cu, O), (Bi, Sr, Ca, Cu, O), (Tl, Ba, Ca, Cu, O) and elemental replacements or substitutions thereof.

23. A detector as set forth in claim 19 wherein the first, second, third and fourth dielectric layers are each comprised of an amorphous polycrystalline insulator, a crystalline insulator, or a thinned single crystal superconductor substrate material.

24. A detector as set forth in claim 19 wherein the first, second, third and fourth dielectric layers are each comprised of a material selected from the group consisting essentially of silicon dioxide, silicon nitride, aluminum, magnesium, zirconium, rare-earth or niobium oxides, epitaxially grown layers comprised of compounds related to adjacent superconducting material, oxides of Mg, Al, Strontium Titanate, Lanthanum Gallate, Lanthanum Aluminate or combinations thereof.

25. A detector as set forth in claim 19 wherein at least the first transmission line electrode, the second transmission line electrode, the second RF ground electrode and the third RF ground electrode are each comprised of a material selected from the group consisting essentially of Pb, Nb, NbN, superconducting compounds having an A-15 crystal structure, $Nb_3(M)$ where M is Sn, Al or Ge, or compounds based on compositions containing (Y, Ba, Cu, O), (Bi, Sr, Ca, Cu, O), (Tl, Ba, Ca, Cu, O) and elemental replacements or substitutions thereof.

26. A detector as set forth in claim 19 wherein the first and the second transmission line electrodes each have an input port for coupling to a frequency source and an output port for coupling to an event detector means for detecting a substantially simultaneous occurrence of a change in output frequency of each of the transmission line electrodes for indicating an occurrence of a noise event.

* * * * *